Dec. 22, 1970 — B. J. GROTZ, JR — 3,549,335

AUTOTHERMAL REACTOR

Original Filed Oct. 22, 1965 — 4 Sheets-Sheet 1

INVENTOR
BERNARD J. GROTZ, JR.
BY
Lyon & Lyon
ATTORNEYS

Dec. 22, 1970     B. J. GROTZ, JR     3,549,335
AUTOTHERMAL REACTOR
Original Filed Oct. 22, 1965     4 Sheets-Sheet 2

INVENTOR
BERNARD J. GROTZ, JR.

Lyon & Lyon
ATTORNEYS

Dec. 22, 1970   B. J. GROTZ, JR   3,549,335
AUTOTHERMAL REACTOR

Original Filed Oct. 22, 1965   4 Sheets-Sheet 3

INVENTOR
BERNARD J. GROTZ, JR.
BY
Lyon & Lyon
ATTORNEYS

Dec. 22, 1970  B. J. GROTZ, JR  3,549,335
AUTOTHERMAL REACTOR
Original Filed Oct. 22, 1965  4 Sheets-Sheet 4

INVENTOR
BERNARD J. GROTZ, JR.
BY
Lyon & Lyon
ATTORNEYS

United States Patent Office 3,549,335
Patented Dec. 22, 1970

3,549,335
AUTOTHERMAL REACTOR
Bernard J. Grotz, Jr., Arcadia, Calif., assignor to C. F. Braun & Company, Alhambra, Calif., a corporation of California
Original application Oct. 22, 1965, Ser. No. 501,260, now Patent No. 3,442,613, dated May 6, 1969. Divided and this application Sept. 12, 1968, Ser. No. 798,213
Int. Cl. B01j 9/04; C01b 2/14, 2/30
U.S. Cl. 23—288       3 Claims

ABSTRACT OF THE DISCLOSURE

The present invention relates to a reactor for the autothermal conversion of hydrocarbons suitable for use in a process for the production of ammonia comprising an outer shell having an inlet and an outlet; within said outer shell an inner shell, said inner shell being separated from the outer shell along a major portion of its length by a fluid conducting space and being connected to said outer shell at a point proximate to the outlet of said outer shell, said inner shell having a plurality of openings in the wall thereof; within said inner shell a plurality of gas conducting tubes; and in communication with the end of said tubes a chamber for containing catalyst, the walls of said chamber being spaced from the walls of said inner shell to provide a fluid conducting space between said chamber and said inner shell.

---

This application is a division of my copending application Serial No. 501,260, filed Oct. 22, 1965 now U.S. Patent 3,442,613, for Hydrocarbon Reforming for Production of a Synthesis Gas From Which Ammonia Can Be Prepared.

The present invention relates to a process for reforming hydrocarbons and particularly to such a process wherein a hydrocarbon is reformed to obtain hydrogen, air is added as a source of nitrogen, and the resulting gases are purified to obtain a stoichiometric mixture of the synthesis gas from which ammonia is obtained.

The production of ammonia from natural gas is well known in the art. Generally, natural gas, such as methane, water in the form of steam, and air are combined in a series of chemical reactions to produce ammonia of a high degree of purity. The following four chemical reactions are the principal reactions involved in the conventional ammonia process.

Reforming reaction—$CH_4 + H_2O \rightarrow CO + 3H_2 - 97{,}000$ B.t.u./mole
Shift reaction—$CO + H_2O \rightarrow CO_2 + H_2 + 16{,}500$ B.t.u./mole
Oxidation reaction—$H_2 + \tfrac{1}{2} O_2 \rightarrow H_2O + 57{,}000$ B.t.u./mole
Ammonia synthesis $\tfrac{3}{2}$—$H_2 + \tfrac{1}{2} N_2 \rightarrow NH_3 + 23{,}000$ B.t.u./mole The degree to which these chemical reactions go to completion is generally a function of temperature, pressure and constituents present in the respective reactions. For example, the reforming reaction is conventionally conducted at high temperatures, at moderate pressure and in the presence of a large excess of steam, while the ammonia synthesis reaction is conducted at very high pressures, moderate temperatures and a moderate degree of reactant purity. These extremes in the reaction conditions of the two primary steps in the formation of ammonia as practiced in the prior art have required first that the reforming reaction be as complete as possible to reduce to a minimum the amount of unconverted methane, and second that the air added to obtain nitrogen be in an amount just sufficient to provide the proper stoichiometry. Thus, the synthesis gas is conventionally obtained by a primary reforming step, a secondary reforming step, a series of purification steps, and finally the ammonia synthesis.

The conventional primary reforming step has been described, for example, in U.S. Patent No. 3,132,010 to John B. Dwyer, entitled "Reforming Of Gaseous Hydrocarbons." As is pointed out there, the development of improved reaction tubes for the primary reformer has permitted higher pressures and temperatures whereby the amount of methane in the exit gases fom the primary reformer is reduced to a minimum. It is to be noted that in conventional processes the unconverted methane coming from the primary reformer must be kept very low, because it becomes a diluent in the synthesis reaction. Accordingly, the primary reforming step in the prior art was conducted at high temperatures and large excesses of steam as has been described, for example, in U.S. Patent No. 3,081,268, to keep the unconverted methane within workable limits. These high reforming temperatures require more reforming heat, both because of the higher sensible heat and because of the exothermic nature of the shift reaction which occurs simultaneously.

In conventional secondary reforming air is added to the effluent from the primary reformer to introduce nitrogen for the synthesis gas and oxygen which reacts with the combustible components to form oxides of carbon and steam. Because of the necessity of keeping the product effluent as pure as possible, the conventional processes introduce the stoichiometric amount of nitrogen to the secondary reformer. Since the amount of hydrogen is determined by the efficiency of the primary reformer, the amount of nitrogen, and thus the amount of oxygen, to be introduced into the secondary reformer is predetermined for a particular process. It will be seen therefore that methane, a diluent in the synthesis gas, controllable primarily by the reaction conditions present in the primary reformer, is similarly present in an amount determined by the oxygen added in the secondary reformer.

In the purification steps carbon monoxide is converted to carbon dioxide by the shift reaction. As much of the carbon monoxide as is considered practicable, considering catalyst availability, is shifted to carbon dioxide. The majority of this contaminant is removed by solvent extraction, and the remaining carbon monoxide and residual carbon dioxide are converted to methane in a reversed reforming reaction. It will be seen therefore that in conventional processes the carbon oxides must be held to a very low level since, as noted above, methane acts as a diluent in the ammonia synthesis reaction.

The necessity of maintaining a minimum amount of impurity in the effluent from the primary and secondary reformers, and of eliminating to the greatest practicable extent the oxides of carbon, has necessitated harsh reaction conditions in the primary reformer and has decreased the exothermic hydrogen combustion in the secondary reformer, all of which significantly increases the cost of subsequently synthesizing the ammonia.

It is accordingly an object of the present invention to provide a process whereby ammonia may be economically produced.

It is a further object of this invention to provide an ammonia synthesis process wherein the reaction conditions in the primary reformer are significantly milder than those now required.

It is a further object of this invention to provide a process wherein the combined primary and secondary reforming reaction may be combined in an autothermal reformer.

It is a more particular object of the present invention to provide a process whereby the synthesis gas used in producing ammonia may be readily and economically purified prior to the synthesis reaction.

Other objects and advantages will, it is believed, be apparent to those skilled in the art from the following detailed description of preferred embodiments thereof when taken in connection with the accompanying drawings.

Briefly, the present invention comprises a process for reforming hydrocarbons to obtain a synthesis gas containing stoichiometric amounts of hydrogen and nitrogen from which ammonia may be formed, and comprises reforming a hydrocarbon by successive reaction first with steam and then with air in an amount sufficient to provide a stoichiometric excess of nitrogen of from about 2.0 to about 150 mole percent based upon the mole percent of nitrogen in said synthesis gas, said percentage being calculated on a dry mole basis, to obtain an effluent gas comprising water, hydrogen, carbon oxides including carbon monoxide, nitrogen and methane; drying the effluent gas to substantially remove all water therefrom to obtain a raw synthesis gas which comprises hydrogen, nitrogen and residual methane; and cooling the synthesis gas to condense the nitrogen to remove the residual methane and nitrogen in excess of the stoichiometric amount necessary to react with hydrogen to obtain ammonia, whereby there is obtained a stoichiometric mixture of hydrogen and nitrogen from which ammonia may be formed. In primary reforming according to this invention, methane or other hydrocarbons in the feed react with the steam to form an effluent containing water, hydrogen in an amount of from 30 to 80 mole percent, carbon oxides including carbon monoxide in an amount of from about 10 to 40 mole percent, and methane in an amount of from about 5 to 50 mole percent, all percentages being calculated on a dry mole basis. The effluent from the secondary reforming operation using the excess air comprises water, between 35 and 70 mole percent hydrogen, 10 and 40 mole percent carbon oxides including carbon monoxide, and residual methane, all percentages being calculated on a dry mole basis.

The process additionally comprises the following steps prior to the drying step: The removal of heat from the reforming effluent to generate steam for power generation and for the reforming; the shift conversion of the reforming effluent which involves reacting the carbon monoxide in the effluent with water in the presence of a shift conversion catalyst to convert carbon monoxide to carbon dioxide; the removal of substantially all carbon dioxide from the effluent; and the methanation reaction of the residual carbon oxides in the effluent with hydrogen in the presence of a methanation catalyst to convert the carbon oxides to methane. The conversion of the stoichiometric mixture of hydrogen and nitrogen to ammonia forms the final phase of the process.

In another embodiment of my invention, the gases normally provided by the primary reforming operation are obtained instead from other sources. For example, by-product hydrogen and carbon oxides from other chemical processes may be blended, further mixed with methane and steam, heated and pressurized to provide a gas stream having a composition similar to that normally present in the primary reformer effluent. In this way the primary reforming operation is eliminated. However, the other phases of my process remain essentially unchanged, and thus the various advantages provided by the use of excess air are retained.

In the conventional process the amount of air used in secondary reforming is limited to that amount which will just produce a 3:1 hydrogen to nitrogen ratio and a small residual amount of methane in the methanator effluent. In contrast thereto, the process of the present invention is based on the use of more air than is required for a 3:1 ratio. The oxygen in the extra air increases gas combustion to supply heat to reduce the primary reforming heat duty which reduces the overall heat requirement and reduces primary reforming cost. One of the most important advantages of the process of this invention is that by using excess air the heat of combustion generated in secondary reforming may be made sufficient to provide the necessary endothermic heat of reaction in both primary and secondary reforming. In addition, the surplus nitrogen introduced in reforming is used effectively to remove methane and other impurities in the subsequent cryogenic purification operation. Another of the unique aspects of the process of this invention is the expansion of the main process stream to supply the refrigeration. This throws the refrigeration work load into the main synthesis gas compressor and subsequently simplifies the refrigeration apparatus and improves refrigeration efficiency. Since the methane is removed, a greater amount can be permitted in the secondary reforming effluent, thus reducing the effluent temperature which further reduces primary reforming heat duty and cost. Additionally, a lesser excess of steam than is conventionally used may be employed at any given pressure. Finally, the synthesis gas prepared by this process for conversion to ammonia is of much greater purity permitting more efficient synthesis of the hydrogen and nitrogen to ammonia.

Once the 3:1 ratio is exceeded, the determining optimum quantity of process air used in secondary reforming is dependent on various factors. The air must be compressed and increased compression energy offsets part of the reduced reforming energy. The methane leakage is also a variable. There is a complex relationship between the amount of methane leakage, the excess nitrogen, and the purity of the synthesis gas after cryogenic purification and its affect on the synthesis action performance. The optimum design is an economic balance among these and other cost factors involved in the process design. For the present design the use of excess air to provide about 53 mole percent more than the stoichiometric amount of nitrogen has been determined to be optimum.

Turning to the drawings.

Figure 1:
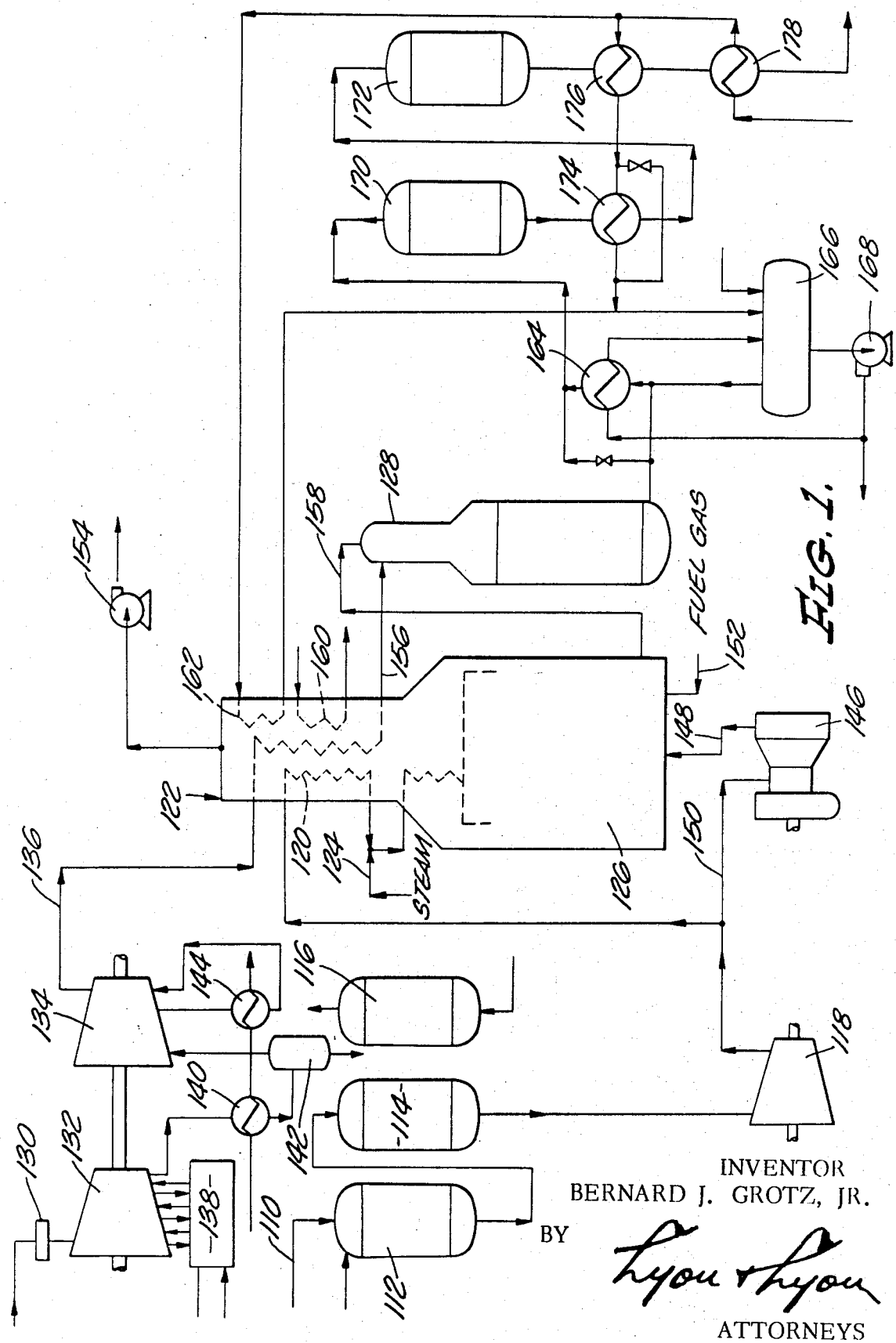
FIG. 1 shows the feed desulfurization, feed compression, feed preheating, steam addition, air compression and preheating, gas turbine driver, an illustrative primary and secondary reforming, waste heat recovery and shift conversion steps of the process.

As shown in FIG. 1, the feed natural gas is introduced at 110. Then trace quantities of sulfur in the feed gas are removed in a desulfurizing operation. This is accomplished in one way by passing the feed gas through a bed of iron sponge in drum 112 and then through beds of activated carbon in drums 114 and 116, the use of drum 116 being optional. The desulfurized feed gas is compressed to reforming pressure in the feed gas compressor 118. The feed gas is then preheated in the convection section 120 of primary reformer 122, mixed with steam through line 124 and further preheated before entering the reformer catalyst tubes in the lower radiant section 126 of reformer 122. The amount of feed heating in convection section 120 before mixing with steam from line 124 is simply a matter of heat exchange economy. However, the preheating could be dispensed with altogether.

In the process shown in FIG. 1, the primary reforming operation is carried out in primary reformer 122, which contains a number of tubes filled with conventional nickel reformer catalyst arranged vertically in the lower radiant section 126 of the furnace. Some 60% of the heat absorption is endolthermic heat of reaction. The remaining is sensible heat required to raise the reformer outlet temperature to a level adequate for reaction equilibrium. This heat is supplied by the introduction of fuel gas at 152. The necessary movement of the fuel gases through reformer 122 is provided by induced draft fans 154.

Preheated process air from the line 156 in the above-indicated excess amount, and primary reformer effluent from line 158 are reacted in the secondary reformer 128. Secondary reformer 128 consists of a combustion zone in which the oxygen in the air reacts with some of the combustible components in the primary reformer effluent. The exothermic heat from the combustion reaction is used for additional autothermal reforming of methane to hydrogen, carbon monoxide and carbon dioxide in the presence of a conventional nickel reforming catalyst.

Waste heat is recovered from the stack gas of the primary reformer 122 as it leaves the upper section thereof. The heat is recovered in convection coils 160 and 162, the former heating superheated steam and the latter heating boiler feed water. Heat is also recovered from the effluent of the secondary reformer 128, by passing the effluent through steam generation exchanger 164. The steam from exchanger 164 and from coil 162 is passed through separator drum 166. Pump 168 also circulates water to the synthesis steam generation exchanger.

The reforming effluent is then reacted in a shift conversion reaction essentially involving the following reaction: $CO+H_2O \rightarrow CO_2+H_2$. The reaction equilibrium yields some 50% conversion at the secondary reformer outlet temperature. However, due to the temperature reduction in steam generation exchanger 164, this is increased to 88% in the first shift converter 170. The effluent from converter 170 is cooled in heat exchanger 174 by heat exchange with boiler feed water before introduction in secondary shift converter 172 to raise reaction equilibrium to about 95% in converter 172. Both shift converters 170 and 172 contain conventional iron oxide shift conversion catalyst. However, converter 172 could employ the copper-zinc low temperature shift catalyst.

Heat in the effluent from secondary shift converter 172, including the exothermic heat from secondary conversion is recovered by heat exchange with the boiler feed water in heat exchangers 176 and 178. The heated boiler feed water produced by passage through heat exchangers 174, 176 and 178 is subsequently recovered in separator drum 166. The method of heat recovery is not critical.

Air for the secondary reformer 128 is compressed after passing through filter 130 in compressors 132 and 134. The heat of compression generated in compressor 132 is removed by intercooler 138. Between compressors 132 and 134 is positioned aftercoolers 140 and aftercooler knockout drum 142, to remove water. Compressor 134 is also provided with an intercooler 144. Intercoolers 138 and 144, as well as aftercoolers 140 and 142 are normally provided with cooling water initially at about room temperature to provide the required heat exchange. This heat exchange reduces the total work required by the compressors. The compressed air from line 136 is then heated by passage through the upper end of the primary reformer 122 and hence at an elevated temperature and pressure is introduced into the upper portion of secondary reformer 128.

Gas turbine 146 is used to drive air compressors 132 and 134 to supply combustion air to the secondary reformer 128. The turbine exhaust is used for combustion inside primary reformer 122 through line 148. The fuel gas consumed by turbine 146 is supplied from feed gas compressor 118 via line 150. A steam turbine driver could also be used.

Figure 2:
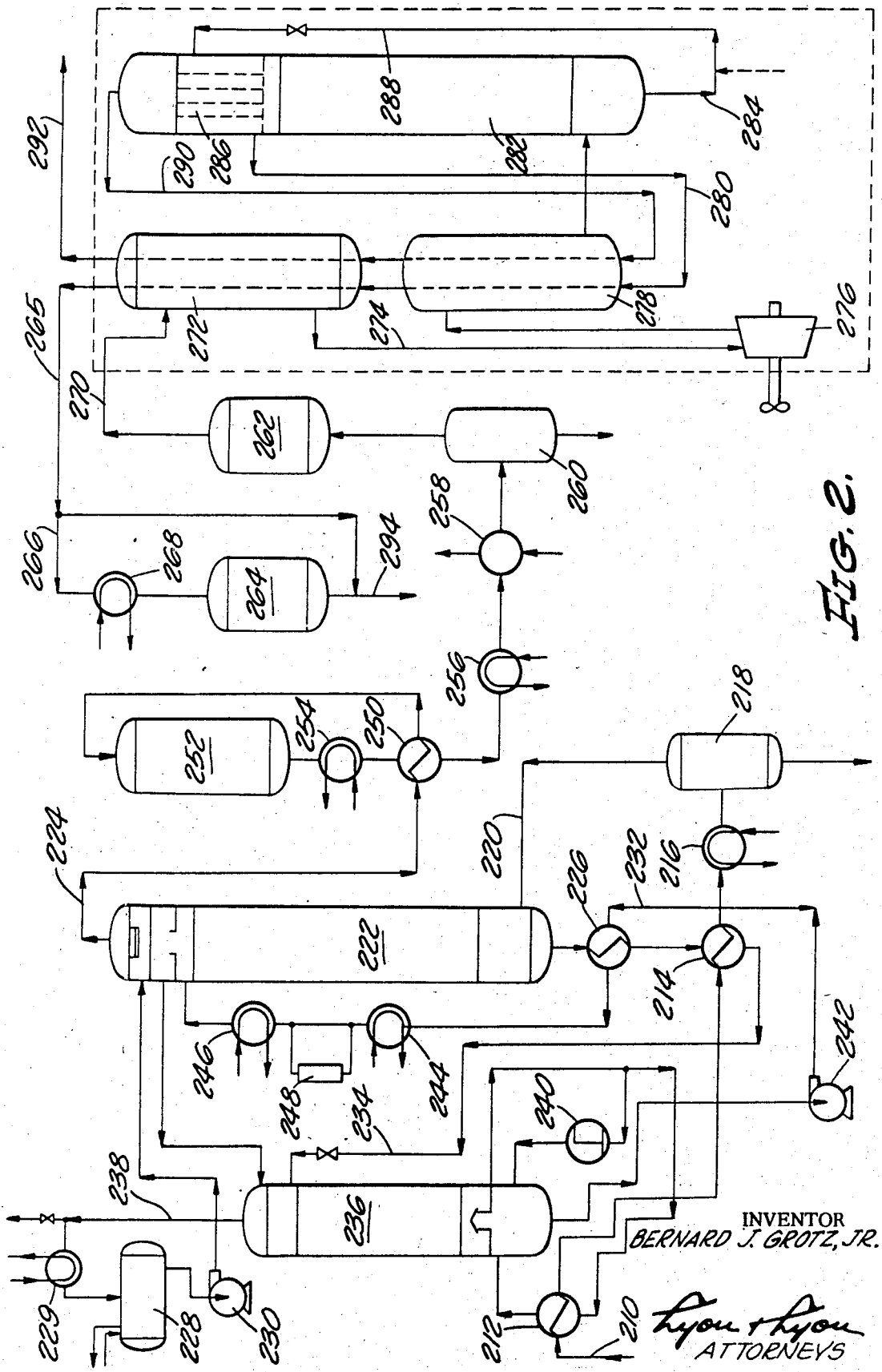
FIG. 2 shows carbon dioxide removal, methanation, effluent cooling and drying, and cryogenic purification steps of the process.

Turning to FIG. 2, after the secondary shift converter effluent is cooled, it is passed via line 210 through heat exchangers 212, 214 and 216 to condensate drum 218 where a substantial amount of the condensed water from the effluent is removed. The stream of gas is then passed via line 220 into carbon dioxide absorber 222, where the carbon dioxide is removed by solvent extraction. In general, the solvent is pumped from solvent regenerator 236 via pump 242 through exchanger 226 and solvent coolers 244 and 246 into the absorber 222. The process gas entering by line 220 is removed by way of line 224. The solvent containing the carbon dioxide is removed via line 234 to solvent regenerator 236 through heat exchangers 226 and 214. Steam is condensed from the carbon dioxide leaving the regenerator 236 via line 238 in condenser 229 and collected in accumulator 228. Condensate is pumped via pump 230 to absorber 222 and stripper 236 to prevent solvent losses. The recovery of the solvent from the carbon dioxide does not form a critical part of this invention. Interposed between exchangers 244 and 246 is filter 248 which may be used as required. The carbon dioxide from the accumulator 228 may be converted to Dry Ice or to urea in a manner familiar to those skilled in the art.

The process gas from line 224 is then passed via heat exchanger 250 into the methanator 252. In the methanator 252 carbon oxides react with hydrogen in the presence of conventional methanation catalyst to form methane. The methanator effluent is first cooled by heat exchange with saturated steam in heat exchanger 254, then by heat exchange with the methanator feed in heat exchanger 250. The effluent from methanator 252 is then further cooled first with cooling water in cooler 256, and then with refrigerant ammonia in methanator effluent chiller 258. The chilled process gas is then passed through condensate drum 260 to remove additional water and then to silica gel dryers 262 and 264. The chilling of the process gas in chiller 258 is advantageous because it reduces the water load for dryers 262 and 264 and also reduces the refrigeration load, heat exchange, and compression work in the cryogenic purification section. The dryers 262 and 264 are of conventional construction, the one dryer being on stream while the other is on regeneration. A portion of the vent gas from the cryogenic purification section containing mostly nitrogen and methane is used via lines 265 and 266 to remove the absorbed water from the bed on regeneration, in the arrangement shown in the drawings. The regeneration vent gas is heated by heat exchange with steam in heat exchanger 268.

The cryogenic purifier section, as indicated above, performs an essential function in the process of this invention by removing the nitrogen from the excess air introduced during reforming. The raw product syngas from line 270 contains nitrogen in excess of the stoichiometric amount as well as a small amount of methane.

The cryogenic purifier consists of feed-effluent heat exchangers 272 and 278, a gas-expander 276, a vapor-liquid contacting rectifier column 282, and a reflux condenser 286. The raw syngas is cooled by heat exchange with the product introduced through line 290. Net refrigeration for the unit is energy removal from the feed stream by the gas expander 276. The expander could also be used on the product gas 290, but not as efficiently. The product is further purified by the rectifying column 282. Partial condensation in the reflux condenser 286 is achieved by heat transfer to the column bottoms condensate which is evaporated at a reduced pressure.

The feed is cooled to below its dew point by simultaneous heat exchange with the purified product and the vent gas in brazed aluminum plate fin heat exchangers 272 and 278. Other types, such as a shell and tube heat exchanger, may also be used.

The gas expander 276 is a radial inflow reaction turbine which removes work. In this process, the gas from line 274 is expanded and cooled about 8° F. Other types of gas expanders such as axial flow turbine and reciprocating piston engine can also be used. The power absorber is a centrifugal oil pump on the same shaft with the turbine. Other types of power absorbing devices may be used such as electric generator or gas compressor.

The rectifying column 282 and reflux condenser 286 are preferably constructed as a single unit. The rectifier is packed with aluminum pall rings, sieve trays, bubble cap trays, or other vapor-liquid contacting devices. The reflux condenser 286 consists of a shell and tube heat exchanger directly mounted vertically on the top of the rectifying column. The bottom tubesheet forms the top of the rectifying column so that the bottom heat of the exchanger is a common chamber with the top of the rectifying column.

Other arrangements of the reflux condenser 286 may also be used such as a U-tube exchanger with vaporizing liquid inside the tubes and mounted in the column or a separately mounted heat exchanger with a liquid separator.

The liquid drops out and is removed at the bottom via line 284. The vapor flows up through a bed of vapor-liquid contact packing and then through vertical condenser tubes 286. Liquid nitrogen and methane condensate flows down the condenser tubes 286 and then flows down over the packing as reflux. The excess nitrogen together with some 65% of the argon and almost all of the methane leaves the bottom of the rectifier condenser 282 as liquid. The use of the rectification section refluxed via line 288 increases the purity of the product syngas. In a single condensate step the argon removal would be reduced from 65% to about 50%, and methane removal would be reduced from 99.9% to about 90% due to less rectification in the column.

Bottoms liquid from the rectifier column 282 is throttled to a reduced pressure and flows over the outside of the condenser tubes 286 in the top of the rectifier condenser 282. Partial vaporization of the bottoms provides the reflux via line 288. Purified syngas from the top of rectifier condenser 282 and partially vaporized bottoms via line 280 go to the exchangers 278 and 272. After heat exchange ends the purified syngas goes to the synthesis compressors via line 292. As has been indicated, the bottom vent gas containing mostly nitrogen and methane goes first via lines 265 and 266 to serve as regeneration gas for dryers 262 and 264 and then goes to fuel via line 294.

Figure 3:
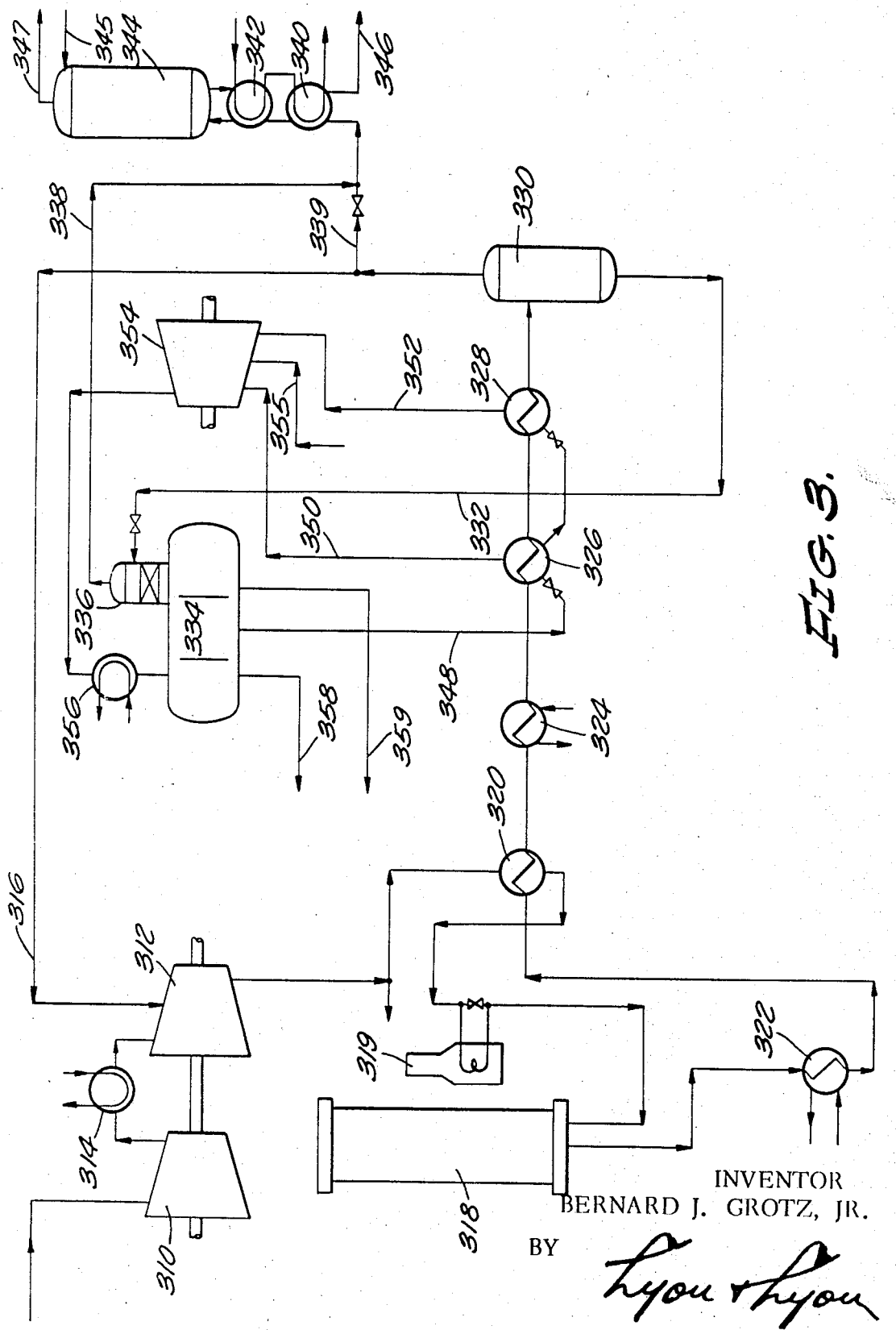
FIG. 3 shows the synthesis section of the process.

In FIG. 3, the product syngas from the cryogenic purification section goes to syngas compressors 310 and 312 which are separated by intercooler 314. The syngas feed is joined in the final step of compression by recycled gas from the product recovery via lnie 316. The combined feed plus recycle after compression is preheated by exchange with effluent from synthesis converter 318 in heat exchanger 320. The preheated syngas is then charged to synthesis converter 318. In the converter, a portion of the gas reacts to yield ammonia in the converter effluent. The exothermic heat of reaction raises the effluent temperature of converter 318, generally to about 850° F. from about 550° F. at the converter feed. The converter 318 is equipped with a start-up heater 319 to warm the converter feed until heat exchanger 320 can assume the preheating load.

Heat is recovered from the effluent leaving synthesis converter 318 first by generating high pressure steam in steam generation exchanger 322 and then by preheating synthesis converter feed in exchanger 320. The effluent is then cooled first by cooling water in cooler 324 and then by refrigeration in high level chiller 326 and low level chiller 328. This reduces the temperature of the effluent to about 25° F. to condense the ammonia for product recovery.

The steam from the low level chiller then is separated in high pressure separater 330, with the unreacted vapor being recycled to converter 318 by combining it with the make-up syngas in the last wheel of syngas compressor 312. The product ammonia from the separator 330 is then passed via line 332 to liquid ammonia accumulator drum 334 in which the pressure is reduced to about 220 pounds per square inch. Gas dissolved in the liquid ammonia may be removed as vapor through zone 336 and passed via line 338 to the aqueous ammonia recovery section. This gas may be combined with the gas in the purge from line 339. This stream after passing through heat exchangers 340 and 342, then pases through aqua ammonia absorber 344. The make-up water for the aqua ammonia is supplied from the condensed water removed by the methanator condensate drum 260. The liquid containing 25% ammonia in the form of an aqueous solution is recovered via line 346. The synthesis vent gas containing mostly argon and unreacted hydrogen and nitrogen is removed at 347. The principal product streams containing anhydrous ammonia leave at lines 358 and 359.

A portion of the liquid 90° F. ammonia product from drum 334 is used to provide refrigeration on high level chiller 326 and low level chiller 328. This ammonia is removed from the drum through line 348 and may be returned to the drum via lines 350 and 352 after compression in compressor 354 and coolnig in refrigerant condenser 356. The refrigerant compressor 354 also serves to compress the ammonia used for refrigeration purposes in methanator effluent chiller 258, and is fed to the compressor 354. The 25° F. liquid ammonia from drum 334 is directly marketable in this form. The 100° F. liquid is particularly useful in the manufacture of urea and can be withdrawn for this purpose through line 358. The ammonia product may also be converted at the plant site to other chemicals including nitric acid and ammonium nitrate.

The following example is presented solely to illustrate the invention and should not be regarded as limiting in any way. In the example the parts and percentages are by dry volume and the gas flow rates are on a moles per hour basis unless otherwise indicated. In the example, the process discussed refers to that depicted generally in FIGS. 1 through 3.

EXAMPLE

Through line 110 is introduced, at 125 pounds per square inch and 65° F., a feed gas stream containing 18 moles of carbon dioxide, 1280 moles of methane, 92 moles of ethane, 47 moles of propane and 25 moles of butane per hour. The desulfurizing drum 112 has a bed diameter of 10 feet 8 inches, a depth of 9 feet and contains iron sponge. Drums 114 and 116 are 9 feet in diameter, 7 feet deep and contain activated carbon. The feed gas after passing through the desulfurizing drums is substantially free of sulfur and has a pressure of 120 pounds per square inch and a temperature of 65° F. Upon entering a 1500 horsepower feed gas compressor 118 the feed gas is compressed to a pressure of 450 pounds per square inch and its temperature is raised to 250° F. In this condition the feed gas is preheated in the upper convection zone 120 of primary reformer 122 and is then mixed with steam (6720 moles per hour) at 450 pounds per square inch and 650° F. via line 124. The steam-feed mixture is then further preheated in 890° F. and 435 pounds per square inch before entering the reformer catalyst tubes filled with nickel catalyst in the lower section 126 of reformer 122. Air is taken in through filter 130 and is compressed by compressors 132 and 134 (7000 total horsepower) to provide 2370 moles of nitrogen, 636 moles of oxygen and 28 moles of argon per hour. The air leaves compressor 134 at 426 pounds per square inch and 300° F. Intercoolers 138 and 144 and aftercooler 140 are cooled using water at 75° F. The air passing through line 136 and into the upper portion of primary reformer 122 is heated to 800° F. and 410 pounds per square inch prior to introduction via line 158 into secondary reformer 128. The effluent from the primary reformer entering the secondary reformer via line 158 is at a tempeature of 1303° F. and 408 pounds per square inch. Analysis shows that the effluent from the primary reformer contains 2708 moles hydrogen, 207 moles carbon monoxide, 606 moles carbon dioxide, 911 moles of methane and 5339 moles of water. The reforming reaction in the secondary reformer is promoted by nickel catalyst. The effluent leaving the secondary reformer at 402 pounds per square inch contains 4216 moles of hydrogen, 2370 moles of nitrogen, 28 moles of argon, 831 moles of carbon monoxide, 832 moles of carbon dioxide, 60 moles of methane and 5559 moles of water, and is cooled in exchanger 164 to a temperature of 720° F. At this temperature the stream is fed into shift converter 170 containing 1300 cubic feet of iron oxide catalyst. The effluent from the shift converter 170 is at 797° F. and contains 4845 moles hydrogen, 2370 moles nitrogen, 28 moles argon, 202 moles carbon monoxide, 1461 moles carbon dioxide, 60 moles methane and 4930 moles of water. This stream is cooled to 620° F. in heat exchanger 174 and is introduced into the second shift converter 172 containing 2850 cubic feet of iron oxide catalyst. The stream leaving shift converter 172 contains 4960 moles of hydrogen, 2370 moles nitrogen, 28 moles argon, 87 moles carbon monoxide, 1576 moles carbon dioxide, 60 moles methane and 4815 moles water. The effluent from the secondary shift converter 172 is then cooled in heat exchanger 176 from 627° F. to 395° F., and subsequently further cooled in exchanger 178 to 333° F. and 368 pounds per square inch. This stream is then cooled to 278° F. in effluent reboiler 210 and subsequently to 210° F. in preheater 214 and then to 140° F. and 383 pounds per square inch in cooler 216. In effluent condensate drum 218 the condensed water is removed at a rate of 85,530 pounds per hour. The stream passing through line 220 is then admitted to carbon dioxide absorber 222 where 1575 moles of carbon dioxide are removed per hour. Thus, the feed passing through line 224 to methanator 252 has the composition of 4960 moles of hydrogen, 2370 moles of nitrogen, 28 moles of argon, 87 moles of carbon monoxide, 1 mole of carbon dioxide, 60 moles of methane and 18 moles of water per hour. The feed to the methanator is at a temperature of 560° F. The methanator itself contains 540 cubic feet of nickel catalyst. The stream leaving the methanator contains 4694 moles hydrogen, 2370 moles nitrogen, 28 moles argon, 148 moles methane and 107 moles water per hour. Substantially all the carbon dioxide is removed and only about 10 parts per million of carbon monoxide are present in the mathanator effluent. The methanator effluent is cooled from 716° F. first to 636° F. in preheater 254 and then to 165° F. in exchanger 250 then to 85° F. in cooler 256, and finally to 40° F. in chiller 258. A substantial portion of the remaining water is removed in condensate drum 260 at the rate of 1872 pounds per hour. Thus, the feed to the dryer 262 contains 4694 moles hydrogen, 2370 moles nitrogen, 28 moles argon, 148 moles methane and 3 moles water. Substantially all of this water is removed by the silica gel in dryer 262. The raw syngas at 370 p.s.i. and 40° F. entering the cryogenic section at 270 contains 4694 moles hydrogen, 2370 moles nitrogen, 28 moles argon and 148 moles methane. The syngas in line 274 is at —240° F. This temperature is reduced to —248° F. by the removal of 115 horsepower in expander 276. The liquid bottoms removed at 284 is evaporated to develop reflux in condenser 286 and for heat exchange in exchangers 272 and 278 contains 52 moles hydrogen, 822 moles nitrogen, 18 moles argon and 148 moles methane. The syngas leaving line 292 at 305 pounds per square inch and 35° F. contains 4642 moles hydrogen, 1548 moles nitrogen and 10 moles argon, essentially a stoichiometric mixture. This stream is then compressed by compressors 310 and 312 to a pressure of 2185 pounds per square inch at 100° F. and is subsequently heated in exchanger 320 to a temperature of 562° F. prior to introduction into the synthesis converter 318. The recycle gas passing via line 316 combined with the syngas from line 292 results in a feed composition to the converter 318 containing 22,344 moles hydrogen, 7448 moles nitrogen, 1220 moles argon and 1065 moles ammonia. The effluent leaving converter 318 at 2065 pounds per square inch and at an elevated temperature of 850° F. due to the exothermic synthesis reaction contains 17,934 moles hydrogen, 5978 moles nitrogen, 1220 moles argon and 4005 moles ammonia. This stream is cooled first to 640° F. and 2050 pounds per square inch in exchanger 322, and then to 170° F. and 2030 pounds per square inch in exchanger 320, then to 2015 pounds per square inch and 85° F. in cooler 324, then to 2000 pounds per square inch and 50° F. in high level chiller 324 and finally to 1985 pounds per square inch and 25° F. in low level chiller 328. The liquid leaving separator 330 contains 15 moles hydrogen, 6 moles nitrogen, 2 moles argon and 2933 moles ammonia. The 25° F. ammonia product produced in accumlator drum 334 is 2336 moles per hour. In this drum there is also produced 590 moles per hour of 100° F. ammonia. The amount of aqua ammonia produced via line 346 is 14.0 moles per hour.

Instead of using individual reactors for primary and secondary reforming, one reactor of novel design can be used for both primary and secondary reforming. This is made possible by the use of a reactor of the type shown in FIG. 4 in which 410 is an outer shell having an inlet 412 and an outlet 414. Inner shell 416 abuts the outer shell to form a gas-tight seal at 418. Communication of the annular space 420 between shells with the interior of shell 416 is provided by inlet ports 422. The shell 416 is closed at its lower end as shown and thus forms a chamber therewithin which contains at one end a plurality of gas conducting tubes 424 held in place by an upper tube sheet 426 and a lower tube sheet 428. Tube sheet 426 forms the bottom of cylindrical catalyst container 430. The top of inner shell 416 is arranged to permit the introduction of air at 432. The air can be dispersed, as required, by introduction through sparger 434 which projects into the upper open end 436 of container 430. Between inner shell 416 and container 430, is annular space 438 for communicating the primary catalyst zone 440 between tubes 424 with the open end 436. The feed consisting of hydrocarbon and steam enters at 412 and flows down in the annulus 420 around the catalyst container 416 to absorb heat and cool the outer shell. The feed then enters the primary catalyst zone 440 through ports 422. This zone is heated by reaction effluent flowing down through tubes 424. The feed is partially steam reformed in zone 440 with heat supplied by the effluent. The partially reformed gas stream leaves zone 440 and flows in annular space 438 to combustion zone 442 in container 430. Compressed air enters through sparger 434. Effluent from the combustion zone 442 flows to the secondary catalyst bed 444 to promote further steam reforming of the hydrocarbon. Effluent from the catalyst bed 444 flows through tubes 424 preheating the primary catalyst within zone 440, to emerge at outlet 414 for further processing.

Figure 4:
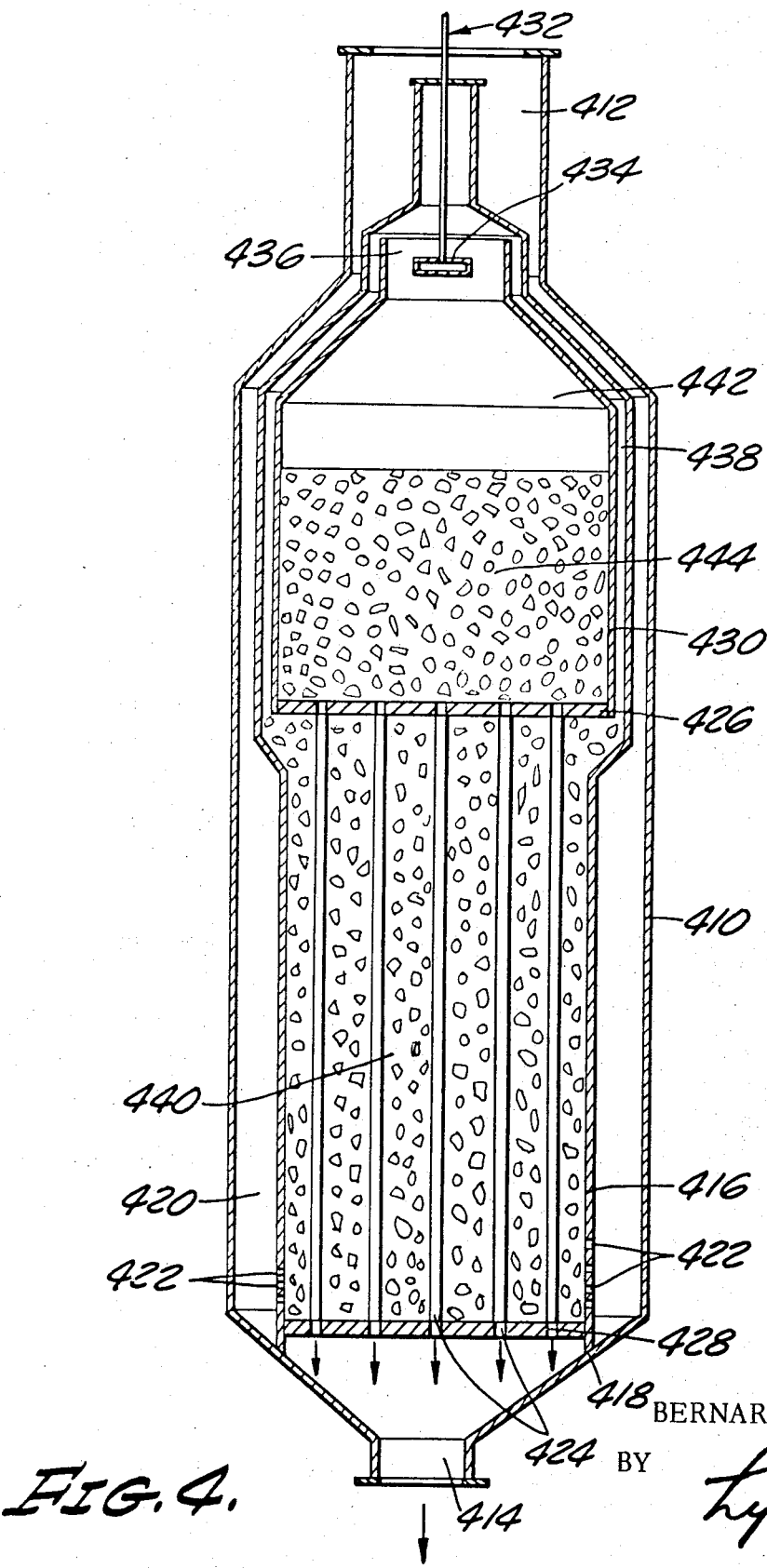
FIG. 4 is a sectional view of a preferred type of apparatus used in the reforming operation.

In the reactor of FIG. 4, the oxygen in the air can supply the entire heat for the reforming reaction by heat exchange of reactor effluent with reactor feed simply by the use of a minimum amount of air, on the order of about 0.39 mole (50 mole percent excess nitrogen over the stoichiometric amount in ammonia) of oxygen per atom of carbon reacted in natural gas. Where the heavier hydrocarbons are used in the feed gas, the minimum amount of air is about 0.30 mole of oxygen per atom of reacted carbon. For this reason, the reactor of FIG. 4 is well adapted to autothermal operation for both primary and secondary reforming. The need for fuel gas, such as is used in primary reformer 122 is eliminated. The use of this reactor is made possible by the fact that excess air over the amount required to provide a stoichiometric amount of nitrogen is used. In the prior processes using only enough air in reforming to provide a stoichiometric amount of nitrogen, the amount of oxygen supplied ranges from about 0.23 mole of oxygen per carbon atom reacted for naphtha reforming to 0.30 for methane.

The feed to the auto-thermal reformer can also be the effluent from a primary reformer. In another mode of operation, the catalyst in zone 440 may be omitted and the secondary reformer feed is preheated in zone 440 simply by heat transfer with effluent passing through tubes 424.

While the foregoing discussion of the process of this invention has made particular reference to the use of natural gas as the feed to be introduced at 110, it will be understood that the new process is not restricted to the use of natural gas. It can be used to an advantage with any hydrocarbon or hydrocarbon-bearing fluids such as refinery gas, naphtha or others.

The type of feed desulfurization and processing conditions in drums 312, 314 and 316 are not important to the new process except that the degree of desulfurization may be relaxed using certain types of shift catalysts.

The feed gas is normally compressed to reforming pressure on the order of about 450 pounds per square inch. However, in many cases the feed gas is available at a pressure sufficient for the process, and feed compression is not required. The optimum pressure for the reforming process is not precisely known. This is because the total energy requirements change very little over a wide range of operating pressures. While the optimum pressure appears to be about 450 pounds per square inch, the range of efficient operation ranges from about 250 pounds per square inch to about 2000 pounds per square inch.

The amount of steam mixed with the feed must usually be sufficient to provide a steam to carbon ratio (moles/atom) of at least about 2:1 in order to prevent coking in the catalyst tubes in the primary reformer. The design steam to carbon ratio used in this process is preferably from about 2.5 to 3.9. This amount of steam is used because it provides a comfortable margin over the coking level and at the same time is well within the wide range that may be used for good efficiency which ranges up to a value of about 8.0.

The temperature to which the feed gas-steam mixture is heated before primary reforming is preferably on the order of 800 to 1000° F. In the case of the auto-thermal reforming, any temperature up to about 1250° F. is suitable, although temperatures within the range from 600 to 900° F. are preferred. Preheating to higher temperatures of up to about 1250° F. reduces reforming duty and consequently saves in costly catalyst tubes. However, hotter preheat also runs the risk of coking in the preheat coils.

The use of two feed air compressors 132 and 134 and two intercoolers 138 and 144 is not essential and is simply a matter of engineering design and apparatus availability. Also the amount of air preheat prior to secondary reforming is simply a matter of engineering economics. The amount of heat picked up in the air pre-heat is reflected as a direct reduction in heat duty for the radiant catalyst tubes. The economics will generally dictate air preheat to certain temperature levels represented by material selection break points, that is, no preheat, 800° F. preheat, 1000° F. preheat or 1200° F. preheat. Generally, the most efficient results are obtained when the air supplied to the secondary reformer or the auto-thermal reformer is at a temperature of from about 800 to 1000° F.

Although the use of the gas turbine 146 represents a significant saving in overall fuel consumption, it is not essential to the process of this invention. The reason for the fuel saving lies in the fact that the principal inefficiency of the gas turbine is in rejecting the exhaust gas at high temperatures while the principal inefficiency in a fired heater is heating the combustion air in the burner. By combining gas turbine 146 and fired heater this efficiency occurs only once. A gas turbine of about 7000 horsepower is usually sufficient for a 600 ton per day ammonia plant.

The reason for driving the process air compressors 132 and 134 with gas turbine 146 is that there is a natural coupling of these two services. The process air used for combustion inside the secondary reformer 128 and the turbine exhaust is used for combustion in the primary reformer 122. Also, the gas turbine 146 consists of an air compresser, a fuel combustor and an expander. It is thus possible to combine the gas turbine air compression with the proces air compression in one machine.

The primary and secondary reforming can be visualized as one reaction step. The total of the heat required to raise the feed streams to secondary reforming effluent temperature plus the endothermic heat of reforming is supplied by absorption in the reformer plus the exothermic heat of reaction of oxygen in the air with hydrogen. The heat absorption in primary reforming can be supplied by burning fuel. However, less than 50% of the heat released by the fuel is absorbed by the radiant tubes. This heat must be driven through some very expensive catalyst tubes. The heat for primary reforming may also be supplied by preheating of the feed gas or heat exchange with the secondary reforming effluent, as in the auto-thermal reformer. All of the heat released by oxidation in secondary reforming is supplied directly to the process. This is an important advantage which results from the use of excess air in reforming.

In the secondary reforming operation shown in FIG. 4, a mixture of feed gas and steam preheated to a temperature of about 500 to 800° F. is further heated by heat exchanger with secondary reforming effluent to a temperature of 800 to 1050° F. The feed is further heated by heat exchange with effluent in the presence of conventional nickel reforming catalyst. This partially reformed mixture is then ducted to a combustion zone in which air is added. The mixture flows over a bed of conventional nickel reforming catalyst, typical of a secondary reformer. Effluent from this bed flows through tubes to provide heat exchange for the primary reforming and feed preheat. Variations of this scheme include the omission of the feed preheater section in the reformer and using a single catalyzed preheat chamber. However, the basic idea is the use of the effluent from the secondary reformer to supply all the reaction heat so that the final effluent from the secondary reformer, after heat exchange, is cooled to within 50° F. to 250° F. of the feed.

The reaction equilibrium in the shift conversion improves at lower temperature. However, lower temperature decreases the reaction rate and greater catalyst volumes are required. The converter inlet temperatures preferably employed, namely, about 720° F. in shift converter 170 and about 620° F. in shift converter 172, represent comprises between catalyst volume and methane leakage involving both reaction rates and equilibrium. However, temperatures ranging from about 600° F. to about 900° F. can be used with the iron oxide catalyst. In the conventional process of the prior art, the shift conversion must be over 98% complete in order to reduce impurities in the syngas to an acceptable level. This is accomplished either by removing carbon dioxide in an additional process step between shift converter beds or, more recently by using a copper-zinc shift conversion catalyst which has appreciable activity at temperatures below 500° F. The entire carbon dioxide removal step adds to the capital cost, and the new low temperature shift conversion catalyst has limited liability because of the tendency for loss of activity due to trace poisons. However, by the process of this invention it is possible to use either the conventional iron oxide shift catalyst or the new low temperature catalyst. The copper-zinc low temperature shift catalyst can be used to advantage by taking the extra shift conversion and relaxing further in the reformer and allowing more methane leakage at the secondary reformer outlet or by further reducing the excess steam used in reforming. While 450° F. is about optimum for the low temperature shift catalyst, it can be used over the temperature range of from about 300° F to 550° F.

The handling of the shift converter effluent prior to methanation to remove carbon dioxide is subject to many modifications since by the process of this invention, any carbon dioxide leaking past the carbon dioxide absorber is removed in the cryogenic section after being converted to methane. Thus, any carbon dioxide removal process which is more efficient in energy consumption but less efficient in product purity can be advantageously used.

The methanator inlet temperature is a compromise in which higher temperatures require less methanator catalyst but needs more heat exchange. Design inlet temperatures range from 500° F. to 700° F. Outlet temperatures range from 600° F. to 750° F. While it is conventional to methanate before feed compression and synthesis, it is not conventional to methanate before cryogenic purification process such as nitrogen wash. This is because in such processes a portion of the carbon monoxide is removed in the purification step. In this new process the methanation precedes low temperature purification so that the dry synthesis gas can go directly to the ammonia converter. The advantage of methanating before cryogenic purification is that methane is removed with the excess nitrogen during the purification to yield an essentially pure synthesis gas.

The steam preheater 254 is used in this design because of the larger methanator temperature rise resulting from a large quantity of carbon monoxide in the feed. However, the steam preheater may also serve as a start-up heater when the nickel methanation catalyst bed is cold. The superheated steam heats the effluent which heats the feed, which heats the catalyst bed to operating temperature, at which point the exothermic heat of reaction takes over. In designs in which the amount of carbon monoxide is much less, for example when using the low temperature shift catalyst, there is not enough heat in the effluent for both the steam heater and the feed preheat. In this case the steam heater 254 is not used and a start-up heater is required.

Regarding the methanator effluent chiller 258, the temperature to which the stream is chilled in chiller 258 is the lowest practical to avoid freezing water in the chiller, about 40° F. Temperature ranging from about 35° F. up to 100° F. or higher may be used.

As has been indicated, the dryers 262 and 264 normally contain silica-gel. However, other conventional desiccants may also be used.

In this process scheme the raw syngas is expanded. This is because it is larger quantity than the purified syngas and the nature of the vapor-liquid equilibrium is such that the reduced pressure makes little difference in the product dew point. However, the purifier process could work equally as well if the expander were located on the purified syngas. The raw syngas is extracted from the heat exchange train for expansion at an elevated temperature for several reasons. First, the expansion of the gas just ahead of the column 282 involves the problem of handling a two phase flow in the turbo expander 276. Second, the expander pressure drop required to take out a given amount is reduced at higher temperatures. In this design the temperature of −240° F. at which the gas is extracted for expansion was selected so as to re-establish the 5° F. approach in the heat exchanger. This gives a proper balance between refrigeration cost and heat transfer surface. However, inlet temperatures to the turbo expander 276 may range from −180° F. to about −280° F. and still achieve efficient operation. There is a temperature in the range of −100° F. above which the expander cannot provide adequate refrigeration even with an excessively large amount of heat exchange surface.

A very important aspect of the cryogenic purifier section design is simplification. Only two controls penetrate the purifier cold box section. A level control for the column 282 bottoms, and a control for the turbo expander 276 are used. All of the other apparatus in this section requires no maintenance. Since all very low temperature process applications require a great deal of thermal insulation this aspect in very important for a practical design.

The pressure to which the syngas is compressed by compressors 310 and 312 is a compromise involving syngas compression, refrigeration compression, recycle compression, and converter size. There is a wide range of pressures which can be effectively used. A pressure of 2200 p.s.i. was selected for this process because it is the highest pressure that can be reached in two compressor cases and it appears to be near optimum for a 600 ton per day plant. If another compressor case were used the discharge pressure could run as high as 4000 p.s.i. which is too high for efficient operation of the centrifugal compressors in 600 ton per day plants. The synthesis pressure can also be increased by increasing the reforming pressure.

Any one of several different types of synthesis converters 318 can be used in this process. In the process illustrated, the inlet temperature to the synthesis converter was 562° F. and the outlet temperature was 850° F. These inlet and outlet temperatures contemplate the single-tube-counter flow or "TVA type" without an internal exchanger. The equilibrium concentration of ammonia in the outlet of the converter decreases rapidly with temperature. On the other hand this reaction seldom reaches equilibrium and the reaction rate increases with temperature. For any one type of converter there is a single set of inlet and outlet temperatures which will give a maximum ammonia production with a given catalyst volume. Accordingly, those skilled in the art will be readily able to establish these conditions for any specific design.

Having fully described the invention, it is intended that it be limited only by the lawful scope of the appended claims.

I claim:

1. A reactor for the autothermal conversion of hydrocarbons to a product containing hydrogen comprising an outer shell having an inlet and an outlet, an inner shell positioned within said outer shell and spaced therefrom along a substantial portion of the length thereof to provide a fluid conducting space therebetween, said inner shell forming a chamber therewithin and abutting said outer shell adjacent the outlet thereof to prevent the flow of fluid from said fluid conducting space directly to said outlet, said inner shell having a plurality of openings in the wall thereof adjacent said abutment in communication with said chamber through which fluid in said fluid conducting space may pass to enter said chamber, said chamber having a zone adjacent said openings adapted to have a catalyst therein, a catalyst container within said chamber positioned adjacent the distal end thereof from said openings, and a plurality of gas conducting tubes positioned within the said catalyst zone of said chamber extending between said container and the lower end of said chamber in communication with said container and said outlet, whereby fluid may pass upwardly through said catalyst zone of said chamber into said catalyst container and downwardly through said gas conducting tubes to said outlet.

2. The reactor of claim 1 including means communicating with said catalyst container to introduce air thereto.

3. A reactor for the autothermal conversion of hydrocarbons to a product containing hydrogen comprising an outer cylindrical shell having an inlet and an outlet, an inner shell positioned within said outer shell, said inner shell having a smaller diameter than said outer shell to provide an annular space between said inner and outer shells along a substantial portion of the length thereof, said inner shell forming a chamber therewithin and abutting said outer shell adjacent the outlet thereof to prevent the flow of fluid from said annular space directly to said outlet, said inner shell having a plurality of openings in the wall thereof adjacent said abutment in communication with said chamber through which fluid in said annular space may pass to enter said chamber, said chamber having a zone adjacent said openings to hold a catalyst therein, a catalyst container within said chamber positioned adjacent the distal end thereof from said openings, the diameter of said container being smaller than that of said inner shell to provide an annular space between said container and said inner shell, and a plurality of gas conducting tubes positioned within said catalyst zone of said chamber extending between said container and the lower end of said chamber in communication with said container and said outlet, whereby fluid may pass upwardly through said catalyst zone of said chamber through said second annular space into said catalyst container and downwardly through said gas conducting tubes to said outlet.

References Cited

UNITED STATES PATENTS

| | | | |
|---|---|---|---|
| 1,910,365 | 5/1933 | Richardson | 23—289 |
| 2,472,254 | 6/1949 | Johnson | 23—288X |
| 3,031,274 | 4/1962 | Scholer | 23—289 |
| 3,050,377 | 8/1962 | Christensen | 23—289 |

JOSEPH SCOVRONEK, Primary Examiner

U.S. Cl. X.R.

23—262, 289; 48—196